United States Patent [19]

Kaufman

[11] 3,940,455

[45] Feb. 24, 1976

[54] HYDROCARBON POLYMERS

[75] Inventor: Martin H. Kaufman, China Lake, Calif.

[73] Assignee: The United States of America as represented by the Secretary of the Navy, Washington, D.C.

[22] Filed: Aug. 31, 1970

[21] Appl. No.: 68,575

[52] U.S. Cl. ........ 260/888; 260/33.6 A; 260/33.6 F; 260/890; 260/897 C
[51] Int. Cl.² .................. C08L 23/22; C08L 27/18
[58] Field of Search .......... 260/34.2, 881, 889, 890, 260/897 C, 900, 888, 33.6 A, 33.6 F

[56] References Cited
UNITED STATES PATENTS

| | | | |
|---|---|---|---|
| 3,005,795 | 10/1961 | Busse et al. | 260/900 X |
| 3,148,234 | 9/1964 | Boyer | 260/900 X |
| 3,224,094 | 12/1965 | Esemplare | 260/900 X |
| 3,294,871 | 12/1966 | Schmitt et al. | 260/900 |

FOREIGN PATENTS OR APPLICATIONS

| | | | |
|---|---|---|---|
| 696,321 | 8/1953 | United Kingdom | 260/33.6 F |

*Primary Examiner*—Leland A. Sebastian
*Attorney, Agent, or Firm*—R. S. Sciasci; Roy Miller; Lloyd E. K. Pohl

[57] ABSTRACT

A technique for improving the tensile strength of extruded fibers by incorporating Teflon into hydrocarbon polymers. These polymeric compositions have extensive application in improving the physical behavior, reliability, and long term storage stability of extruded propellants, pyrotechnics and explosives.

4 Claims, No Drawings

HYDROCARBON POLYMERS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Elastomeric hydrocarbon polymers are known to the art but their utility has been somewhat limited in that they have reduced strength at elevated temperatures. Continued efforts have been directed toward the improvement of the physical behavior, reliability and long term storage of materials of this type. Chopped monofilaments, such as polyesters or polyimides have been incorporated to increase tensile and tear resistance. In the present method hydrocarbon elastomeric polymers were produced which have greatly improved physical properties and are useful in the chemical ordnance field.

DESCRIPTION OF THE INVENTION

In accordance with the present invention Teflon was incorporated into hydrocarbon polymers which are elastomeric to about −45° F. by banding Teflon powder and the hydrocarbon polymer on a rubber mill at a temperature of from about 25° C. to about 70° C., and by premixing the Teflon and hydrocarbon elastomeric polymer by the slurry process then milling, extruding, etc., the product thereof. The Teflon-rubber mixture showed greatly increased strength due to the Teflon which coalesced into fibers and strands in situ during the forming by a conventional process which provides shear.

The following examples are given which will better illustrate the invention.

EXAMPLE I

To butadiene-styrene polymer on a rubber mill powdered Teflon in about 3 parts per hundred of rubber was added. After the addition was completed, milling was continued for a few minutes. The sheet was then removed from the mill and replaced on the same mill so that the direction of milling was approximately 90 degrees from the direction that the sheet had originally been milled. Powdered Teflon (in about 3 parts per hundred of rubber) was added as before and milled into the sheet. The finished reinforced rubber was cut into gaskets which were tested. They were superior in strength to those without the Teflon reinforcement. The reinforced rubber can also be compounded with the usual curatives and additives which are known to the art. A pressed cured sheet of the material had greatly improved physical properties. Noncurable butyl rubber had a tensile strength of about 85 lbs/in$^2$ and an elongation of about 470%. The product produced herein had a tensile strength increased to 426 lbs/in$^2$.

EXAMPLE II

To butadiene-acrylonitrile rubber copolymer, which is elastomeric at about 25° C. and down to about −35° F., Teflon powder in 20 parts by weight Teflon was added to the rolling bank. A Steward Bolling Mill was used with its two 5 inch diameter rolls set at a 1:2.5 ratio: The mill was maintained at 25° C. The compositions were compression molded at 116° C. for 1 hour, and at 160° C. for about 45 minutes, then cured for 24 hours in an oven at 200° C. Curable butadiene acrylonitrile rubber had a tensile strength of 156 lbs/in$^2$ and elongation of 1700% in the uncured state. On adding the 20 parts by weight Teflon on the mill, the tensile strength increased to 250 lbs/in$^2$ and the elongation to 2100%. When the same butadiene-acrylonitrile rubber and Teflon were premixed by solution precipitation and then milled, the tensile strength increased to 325 lbs/in$^2$.

EXAMPLE III

To styrene-butadiene rubber 17% by weight Teflon was added to the rolling bank. The mill was maintained at 25° C. The finished reinforced rubber was cut and tested. The styrene-butadiene rubber had a tensile of 85 lbs/in$^2$ and an elongation of 450%. The product produced herein with the Teflon addition increased the tensile strength to 140 lbs/in$^2$ and the elongation to 640%.

When conventional curatives were mixed with the rubber and Teflon and milled and press cured, the tensile strength increased to 253 lbs/in$^2$. When carbon black was added 50 parts per hundred rubber along with 2 parts sulfur and 1.5 parts benzothiazyl disulfide and 25 parts Teflon followed by milling and press curing, the tensile strength increased to 4000 lbs/in$^2$. The same type increase was found to occur with ethylene-propylene rubber and a polyurethane rubber as well.

EXAMPLE IV

A mixture comprising of 10 parts butyl rubber, 25 parts Teflon and 65 parts carbon was milled and when ram extruded, produced a rod which had a tensile strength of 890 lbs/in$^2$ and an elongation of 75%.

In the uncured state Teflon addition on the mill provides an increase in physical properties. If the Teflon is premixed before milling there is an additional improvement although not as significant.

EXAMPLE V

From 3 to about 85 parts by weight of polytetrafluoroethylene (Teflon) was incorporated into about 100 parts by weight of an elastomeric hydrocarbon polymer selected from the group consisting of ethylene-propylene rubber, butyl rubber, styrene-butadiene rubber, polychloroprene rubber, polyisoprene rubber, and polybutadiene rubber dissolved in a petroleum solvent selected from the group consisting of benzene, toluene, xylene, hexane, cyclohexane, petroleum ether to form a suspension. The elastomeric hydrocarbon polymer and Teflon were coprecipitated by washing with a nonsolvent for the hydrocarbon polymer, such as methanol or ethanol known to the art, then separating the precipitate and drying. The precipitate was then banded on a rubber mill at from 25° to about 70° C. These products showed greatly increased strength. Some butadiene-acrylonitrile rubber, some polysulfide rubbers and polyacrylic rubbers were also used and were dissolved in more polar conventional solvents.

Teflon elongates in situ into strong films and fibers after it is incorporated during any conventional process which provides shear into polymers which are elastomeric at about −40° F., such as the styrene-butadiene polymers, polyisoprene, polychloroprene, polysulfide rubbers, copolymers of ethyl and butyacrylates with 2-chloroethyl vinyl ether, 2-chloroethyl acrylate, acrylonitrile and other comonomers. The phenomenon occurs with ethylene propylene rubbers and butyl rubbers as well. The following are the results of mixtures of butyl rubber and Teflon, the rubbers being elastomeric at as low as about −40° F.

| % Teflon | % Butyl rubber | Tensile strength (psi) |
|---|---|---|
| 20 | 80 | 182 |
| 45 | 55 | 246 |
| 57 | 45 | 324 |
| 75 | 25 | 517 |
| 85 | 15 | 1790 |

These reinforced products exhibited many times increased tensile strength over butyl rubber alone which ranges from about 50 to 80 psi.

As disclosed herein elastomeric compositions prepared with Teflon powder by milling or extrusion have very large increases in tensile strength when measured parallel to the direction of shear and high tear strength when measured perpendicular to the direction of shear. The principal cause of the great improvement in tensile and tear strength is believed to be due to the formation of oriented Teflon fibers and films in the elastomer matrix.

What is claimed is:

1. A method of compounding an elastomeric polymeric composition which comprises dissolving an elastomeric polymer selected from the group consisting of butadiene-acrylonitrile rubber, ethylene-propylene rubber, butyl rubber, styrene-butadiene rubber, polyisoprene rubber, polychloroprene rubber, in a solvent selected from the group consisting of benzene, toluene, xylene, hexane, cyclohexane, petroleum ether to form a solution;

incorporating into said solution polytetrafluoroethylene to form a suspension;

coprecipitating said polymer and said polytetrafluoroethylene by mixing said suspension with a non-solvent for said polymer whereby a precipitate forms;

separating said precipitate from said solvent and drying said precipitate.

2. The method in accordance with claim 1 wherein said dry precipitate is banded on a rubber mill at 25° C. thereby improving the physical properties of said precipitate.

3. An elastomeric polymeric composition consisting essentially of an elastomeric polymer selected from the group consisting of butadiene-acrylonitrile, ethylene-propylene rubber, styrene-butadiene rubber, polyisoprene, polychloroprene, butyl rubber and a polytetrafluoroethylene.

4. The composition in accordance with claim 3 wherein the elastomeric polymer consists essentially of from 15 to 90 percent by weight.

* * * * *